United States Patent

Dehlink

[11] B 3,914,025
[45] Oct. 21, 1975

[54] MICROSCOPE CONDENSER

[75] Inventor: Alois F. Dehlink, Vosendorf, Austria

[73] Assignee: C. Reichert Optische Werke AG, Vienna, Austria

[22] Filed: Dec. 14, 1973

[21] Appl. No.: 425,035

[44] Published under the Trial Voluntary Protest Program on January 28, 1975 as document no. B 425,035.

[52] U.S. Cl. .......................... 350/229; 350/175 ML
[51] Int. Cl.² ........................................... G02B 21/08
[58] Field of Search ................... 350/175 ML, 229

[56] References Cited
UNITED STATES PATENTS
3,790,254  2/1974  Rybicki et al. ........................ 350/229

Primary Examiner—John K. Corbin
Attorney, Agent, or Firm—Alan H. Spencer; William C. Nealon; H. R. Berkenstock, Jr.

[57] ABSTRACT

A 1.30 NA condenser having three components with the first component being a doublet comprised of a plane parallel plate cemented to a hemispherical lens; the second component being a meniscus positive lens and the third component a convex positive triplet is corrected for pupil aberration, especially coma, with a pupil position external to the glass.

1 Claim, 1 Drawing Figure

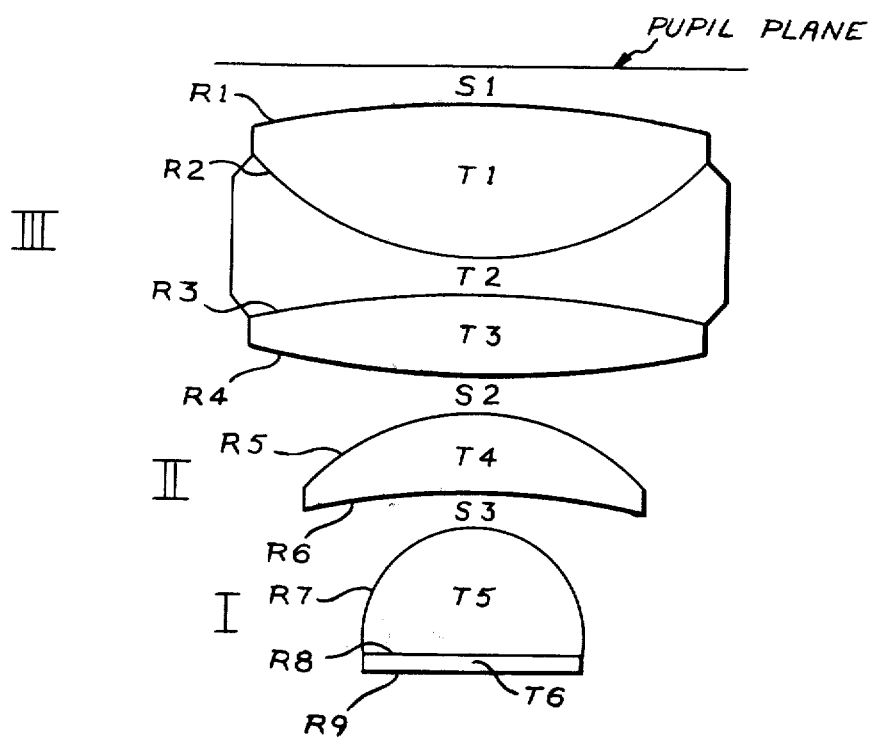

MICROSCOPE CONDENSER

BACKGROUND OF THE INVENTION

The correction for both field and pupil aberrations is significant in that the condenser performs well for both phase and non-phase applications. For the non-phase application, only field correction is necessary. With the phase application, both field and pupil correction are necessary with the pupil correction being especially important. In the prior art, special condensers were necessary on a given microscope for phase applications.

As mentioned above, the pupil positions of the condenser is external to the glass. This external pupil position is significant since it has been found desirable to place phase annuli as near as possible to the pupil position. This is accomplished with superior facility with an external pupil. In the prior art, the annuli was further removed from the focal plane and significantly inferior phase performance was encountered.

OBJECTS OF THE INVENTION

An object of the invention is to provide a microscope condenser being well corrected for both field and pupil aberrations.

It is yet another object of the invention to provide a microscope condenser in which the pupil position is external to the glass of the condenser.

DRAWINGS

FIG. 1 is an optical diagram of one of a series of condensers according to this invention represented as an optical diagram of a condenser having an NA of 1.30.

THE 1.30 NA CONDENSER

This condenser as shown in FIG. 1 is a microscope sub-stage condenser, and in particular, an infinity corrected, achromatic, oil immersion condenser with a numerical aperture of substantially 1.30. It is corrected for field aberrations including coma. It is corrected for pupil aberrations, especially coma. Its pupil position is external to the glass and its focal length and parfocality are compatible with other condensers in the exemplary series herein described.

Referring to FIG. 1, where Roman numerals I, II and III designate the three optically aligned components of said invention. Component I is a doublet composed of a plane parallel plate cemented to a hemispherical lens. Component II is a meniscus positive lens, followed by component III, a convex positive triplet.

The lens parameters are given with the following notations:

Axial thicknesses are designated T1 to T6,
Axial air separations are designated S2 to S3,
Lens radii are designated R1 to R9, where the minus sign (−) applies to surfaces whose center of curvature lies on the side of their vertices toward the pupil plane,
Refractive indices are designated ND1 to ND6, and
Abbe Numbers are designated $\nu 1$ to $\nu 6$.

Numerically stated, the constructional data for one successful form of the invention is given in the chart below:

| Radius R | Thickness T | Space S | Refractive Index ND | Abbe Number $\nu$ |
|---|---|---|---|---|
| R1= 26.752 | | | | |
| | T1 = 8.10 | | ND1 = 1.64049 | $\nu 1 = 60.1$ |
| R2= −21.042 | | | | |
| | T2 = 1.50 | | ND2 = 1.79504 | $\nu 2 = 28.4$ |
| R3= 52.427 | | | | |
| | T3 = 2.70 | | ND3 = 1.69680 | $\nu 3 = 55.4$ |
| R4= −108.3 | | | | |
| | | S2 = 0.11 | | |
| R5= 14.898 | | | | |
| | T4 = 3.25 | | ND4 = 1.69680 | $\nu 4 = 55.4$ |
| R6= 23.216 | | | | |
| | | S3 = 0.11 | | |
| R7= 7.976 | | | | |
| | T5 = 9.30 | | ND5 = 1.69680 | $\nu 5 = 55.4$ |
| R8= PLANO | | | | |
| | T6 = 1.00 | | ND6 = 1.63636 | $\nu 6 = 35.3$ |
| R9= PLANO | | | | |

In the foregoing table, negative signs represent concave radii going from left to right.

In the whole description, I have emphasized that the annuli, aperture stops and pupil positions are "substantially coincident." As will be recognized by those skilled in the art, this means that when the condenser is utilized in a contrast enhancing system, the annuli identically placed below and exterior to the aforementioned condenser is imaged so coincident that common (meaning "same") retardation plates or spatial filtering devices may be used.

It should be understood by those skilled in the art that the lens data is accurate within about ± 3 percent in the second decimal place.

Having thus described the invention in detail and with sufficient particularity to enable those skilled in the art to practice it, what is desired to have protected by Letters Patent is set forth in the following claims.

What is claimed is:

1. A microscope condenser having a numerical aperture of 1.30 and composed of the following components:

a first component I comprised of a doublet composed of a plane parallel plate cemented to a hemispherical lens;

a second component II comprised of a meniscus positive lens; and a third component III, composed of a convex positive triplet in which the parameters of lens radii (R), thicknesses (T), and spacings (S) are expressed in millimeters and a negative sign indicates lens radii on centers of curvature on the object side of the lens

| Radius R | Thickness T | Space S | Refractive Index ND | Abbe Number $\nu$ |
|---|---|---|---|---|
| R1= 26.752 | | | | |
| | T1=8.10 | | ND1=1.64049 | $\nu 1$=60.1 |
| R2= −21.042 | | | | |
| | T2=1.50 | | ND2=1.79504 | $\nu 2$=28.4 |
| R3= 52.427 | | | | |
| | T3=2.70 | | ND3=1.69680 | $\nu 3$=55.4 |

-Continued

| Radius R | Thickness T | Space S | Refractive Index ND | Abbe Number $\nu$ |
|---|---|---|---|---|
| R4= −108.3 | | | | |
| | | S2=0.11 | | |
| R5= 14.898 | T4=3.25 | | ND4=1.69680 | $\nu$4=55.4 |
| R6= 23.216 | | | | |
| R7= 7.976 | | S3=0.11 | | |
| | T5=9.30 | | ND5=1.69680 | $\nu$5=55.4 |
| R8= PLANO | T6=1.00 | | ND6=1.63636 | $\nu$6=35.3 |
| R9= PLANO | | | | |

\* \* \* \* \*